(12) United States Patent  
Goddard

(10) Patent No.: US 9,302,384 B2
(45) Date of Patent: Apr. 5, 2016

(54) MULTI-PURPOSE HITCH TOOL

(71) Applicant: Joseph Goddard, Gaylord, MI (US)

(72) Inventor: Joseph Goddard, Gaylord, MI (US)

(*) Notice: Subject to any disclaimer, the term of this patent is extended or adjusted under 35 U.S.C. 154(b) by 389 days.

(21) Appl. No.: 14/026,687

(22) Filed: Sep. 13, 2013

(65) Prior Publication Data

US 2015/0074915 A1    Mar. 19, 2015

(51) Int. Cl.
*B25F 1/00* (2006.01)
*B60S 3/04* (2006.01)
*B60D 1/58* (2006.01)
*B60B 29/00* (2006.01)

(52) U.S. Cl.
CPC . *B25F 1/006* (2013.01); *B60D 1/58* (2013.01); *B60S 3/045* (2013.01); *B25F 1/00* (2013.01); *B60B 29/003* (2013.01)

(58) Field of Classification Search
CPC ............. B60D 1/58; B25F 1/006; B25F 1/00; B60S 3/045; B60B 29/003
USPC ...................................... 7/143–149
See application file for complete search history.

(56) References Cited

U.S. PATENT DOCUMENTS

| | | | |
|---|---|---|---|
| 880,855 A | 3/1908 | Barrell | |
| 1,487,075 A * | 3/1924 | Olson | A46B 15/0055 132/309 |
| 1,776,277 A | 9/1930 | Battocletti | |
| 1,776,443 A * | 9/1930 | Martin | B25F 1/02 15/111 |
| 3,582,140 A | 6/1971 | Kaufman et al. | |
| 4,310,942 A | 1/1982 | Krape | |
| 4,353,143 A | 10/1982 | Beaudoin et al. | |
| 4,825,597 A | 5/1989 | Matechuk | |
| 5,479,673 A | 1/1996 | Carton | |
| 5,537,707 A * | 7/1996 | Middleton | A46B 17/02 15/106 |
| 5,894,624 A * | 4/1999 | Fulenwider | A46B 7/023 15/105 |
| D434,566 S * | 12/2000 | Mann | D32/35 |
| D465,929 S | 11/2002 | Thomas et al. | |
| D473,717 S | 4/2003 | Park | |
| 7,100,230 B2 * | 9/2006 | Hillenbrand | A63B 57/60 7/156 |
| 7,168,339 B2 * | 1/2007 | Nau | B25D 1/14 7/143 |
| D542,541 S | 5/2007 | Lowsky, Jr. | |
| 7,269,868 B1 * | 9/2007 | Allin | B25D 1/00 7/143 |
| D572,906 S | 7/2008 | Sales | |
| D675,026 S * | 1/2013 | Seehoff | D4/120 |
| 8,341,794 B1 | 1/2013 | Sales | |
| 2005/0188486 A1 | 9/2005 | Tubman | |
| 2008/0289130 A1 | 11/2008 | Bubbers | |
| 2011/0113566 A1 * | 5/2011 | Holbrook | B25F 1/006 7/146 |

* cited by examiner

*Primary Examiner* — Hadi Shakeri
*Assistant Examiner* — Danny Hong
(74) *Attorney, Agent, or Firm* — Gardner, Linn, Burkhart & Flory, LLP

(57) ABSTRACT

A multi-purpose hitch tool includes a removal device that is coupled with a first end of an elongated handle. The removal device is configured to remove a cotter pin from a hitch pin or to strike the hitch pin out of engagement with a hitch receiver. A brush assembly is coupled with a second end of the elongated handle and is configured to remove debris from an interior cavity of the hitch receiver. The brush assembly includes a first bristle array that is configured to scrape the debris from the interior cavity. A second bristle array is disposed over an opposite lateral side of the elongated handle from the first bristle array. The second bristle array is less rigid than the first bristle array and is configured to bend against an interior surface within the interior cavity to bias the first bristle array against an opposite interior surface.

16 Claims, 8 Drawing Sheets

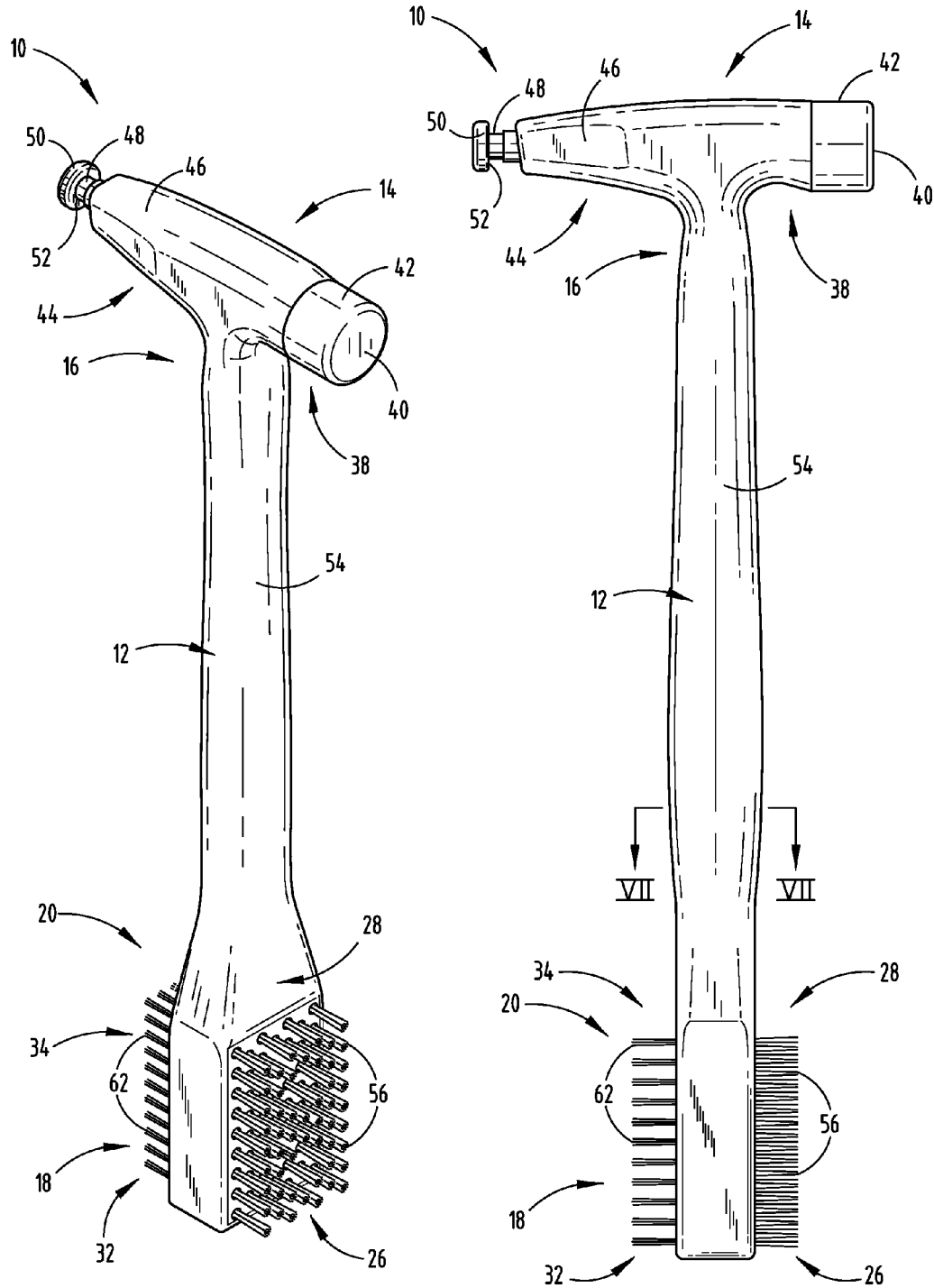

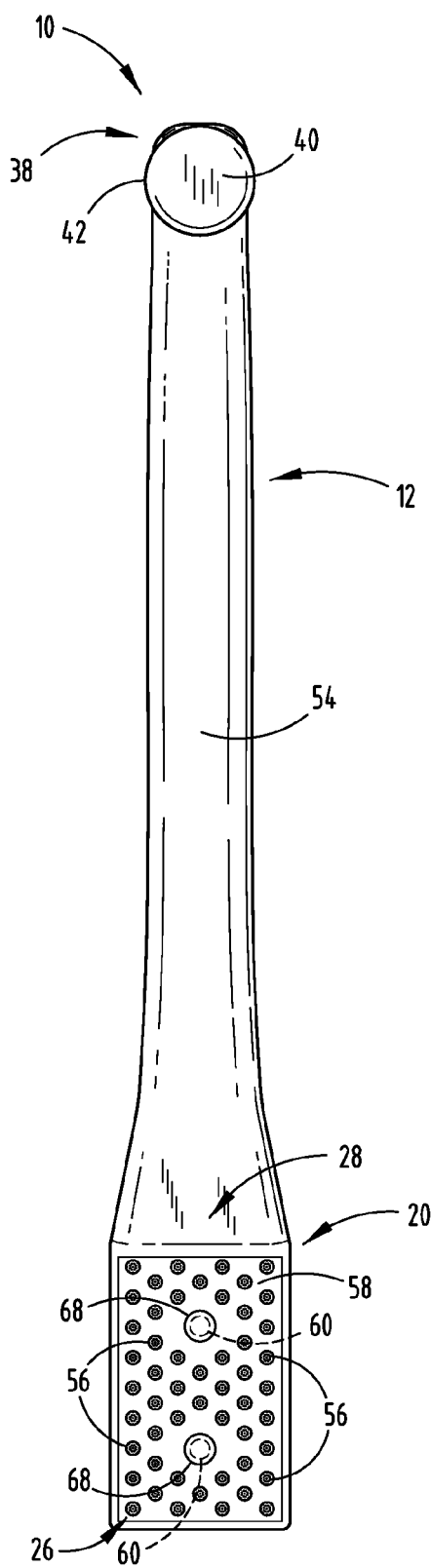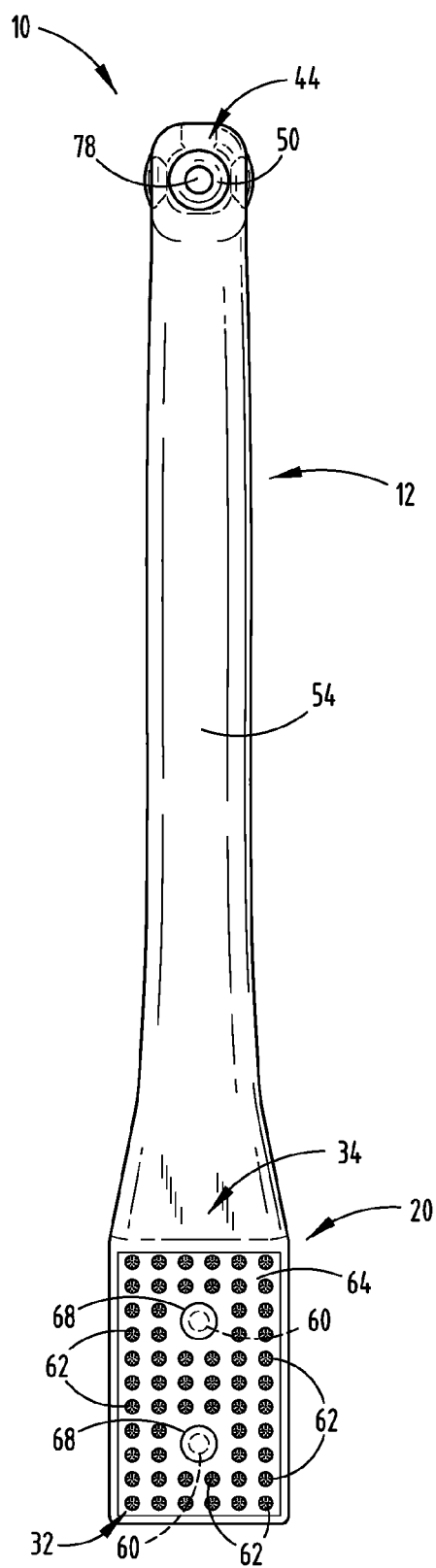

MULTI-PURPOSE HITCH TOOL

FIELD OF THE INVENTION

The present invention generally relates to a multi-purpose hitch tool for cleaning and removing components of a hitch assembly, and more particularly to a multi-purpose hitch tool having a removal device and a brush assembly.

BACKGROUND OF THE INVENTION

It is generally understood that vehicles may be equipped with a hitch receiver for towing trailers or attaching other accessories. Commonly, rust and other debris may accumulate within the hitch receiver, making it difficult to insert a hitch mount into the hitch receiver. Once inserted, the hitch mount is typically attached to the hitch receiver with a hitch pin that extends through both the hitch mount and the hitch receiver. A cotter pin may be used to secure the hitch pin within the hitch receiver by passing though one end of the hitch pin. The removal of the cotter pin from the hitch pin is frequently done by inserting an operator's finger into a loop of the cotter pin and forcibly pulling the cotter pin out of engagement with the hitch pin. However, rigid cotter pins and rusted hitch pins can be difficult for an operator to remove. Accordingly, for these reasons, among others, it is desirable to have a tool that may be easily stored within a vehicle that is configured to clean and remove multiple components of a hitch assembly without requiring various pieces or separate tools.

SUMMARY OF THE PRESENT INVENTION

According to one aspect of the present invention, a multi-purpose hitch tool includes an elongated handle and a removal device that is coupled with a first end of the elongated handle. The removal device has a member protruding laterally from the elongated handle that is either configured to remove a cotter pin from a hitch pin or is configured to strike the hitch pin out of engagement with a hitch receiver. A brush assembly is coupled with a second end of the elongated handle opposite the first end and is configured to remove debris from an interior cavity of the hitch receiver. The brush assembly includes a first bristle array disposed over a first lateral side of the elongated handle. The first bristle array is configured to scrape the debris from a first interior surface of the interior cavity. A second bristle array is disposed over a second lateral side of the elongated handle opposite the first lateral side. The second bristle array is less rigid than the first bristle array and is configured to bend against a second interior surface within the interior cavity to bias the first bristle array against the first interior surface.

According to another aspect of the present invention, a multi-purpose hitch tool includes an elongated handle that includes a first end opposite a second end. A body portion of the elongated handle spans generally linearly between the first and second ends. A removal device protrudes orthogonally from the body portion proximate the first end of the elongated handle. The removal device has a head portion configured to remove a cotter pin from a hitch pin that retains a hitch mount within a hitch receiver. A brush assembly is coupled with the body portion proximate the second end of the elongated handle. The brush assembly includes a first bristle array extending orthogonally from a first planar surface on a first lateral side of the body portion. The first bristle array includes rigid metal filaments configured to scrape debris from a first interior surface of the hitch receiver. A second bristle array extends orthogonally from a second planar surface on a second lateral side of the body portion opposite the first lateral side. The second bristle array includes resilient filaments configured to engage a second interior surface of the hitch receiver opposite the first interior surface and to bias the first bristle array against the first interior surface.

According to yet another aspect of the present invention, a multi-purpose hitch tool that is configured for cleaning and removing components of a hitch assembly includes an elongated handle that has a first end, a second end opposite the first end, and a body portion that spans generally linearly between the first and second ends. The body portion has a thickness less than a distance between opposing planar surfaces of a hitch receiver. A removal device is coupled with the elongated handle proximate the first end. The removal device has a first member protruding orthogonally from the body portion for striking the hitch assembly and a second member protruding from the body portion on an opposite side from the first member that includes a neck portion extending to a head portion for removing a cotter pin from the hitch assembly. A brush assembly is coupled with the elongated handle proximate the second end. The brush assembly includes a first bristle array extending orthogonally from a first planar surface on a first lateral side of the body portion. The first bristle array includes rigid metal filaments configured to engage one of the opposing planar surfaces of the hitch receiver and to scrape debris therefrom. A second bristle array extends orthogonally from a second planar surface on a second lateral side of the elongated handle opposite the first lateral side. The second bristle array includes resilient filaments that are less rigid than the rigid metal filaments and are configured to bend in engagement with the other one of the opposing planar surfaces of the hitch receiver to bias the first bristle array against the one of the opposing planar surfaces of the hitch receiver.

According to another aspect of the invention, a multi-purpose hitch tool includes a removal device that is coupled with a first end of an elongated handle. The removal device is configured to remove a cotter pin from a hitch pin or to strike the hitch pin out of engagement with a hitch receiver. A brush assembly is coupled with a second end of the elongated handle and is configured to remove debris from an interior cavity of the hitch receiver. The brush assembly includes a first bristle array that is configured to scrape the debris from the interior cavity. A second bristle array is disposed over an opposite lateral side of the elongated handle from the first bristle array. The second bristle array is less rigid than the first bristle array and is configured to bend against an interior surface within the interior cavity to bias the first bristle array against an opposite interior surface. Accordingly, the multi-purpose hitch tool provides efficient cleaning of the hitch receiver, improved removal of components of the hitch assembly, and a design for organized storage within a vehicle.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top perspective view of a multi-purpose hitch tool, according to one embodiment of the present invention;

FIG. 2 is a side elevational view of the multi-purpose hitch tool;

FIG. 3 is a front elevational view of the multi-purpose hitch tool;

FIG. 4 is a rear elevational view of the multi-purpose hitch tool;

DETAILED DESCRIPTION OF THE EMBODIMENTS

Figure 5:
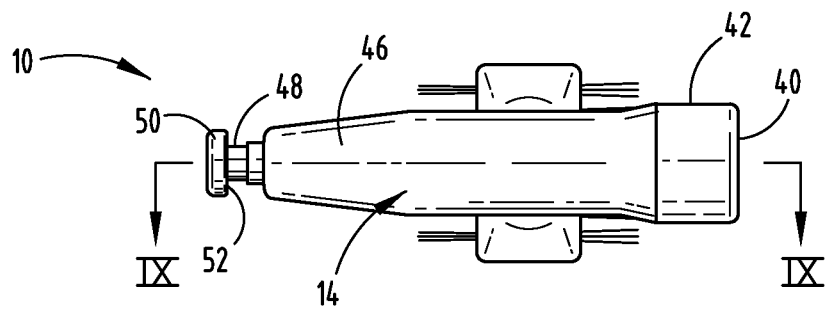
FIG. 5 is a top plan view of the multi-purpose hitch tool.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-14D, reference numeral 10 generally designates a multi-purpose hitch tool that includes an elongated handle 12 and a removal device 14 coupled with a first end 16 of the elongated handle 12. A brush assembly 18 is coupled with a second end 20 of the elongated handle 12 opposite the first end 16 and is configured to remove debris from an interior cavity 22 of a hitch receiver 24. The brush assembly 18 includes a first bristle array 26 disposed over a first lateral side 28 of the elongated handle 12. The first bristle array 26 is configured to scrape debris from a first interior surface 30 of the interior cavity 22. A second bristle array 32 is disposed over a second lateral side 34 of the elongated handle 12 opposite the first lateral side 28. The second bristle array 32 is less rigid than the first bristle array 26 for bending against a second interior surface 36 within the interior cavity 22 to bias the first bristle array 26 against the first interior surface 30.

Figure 11:
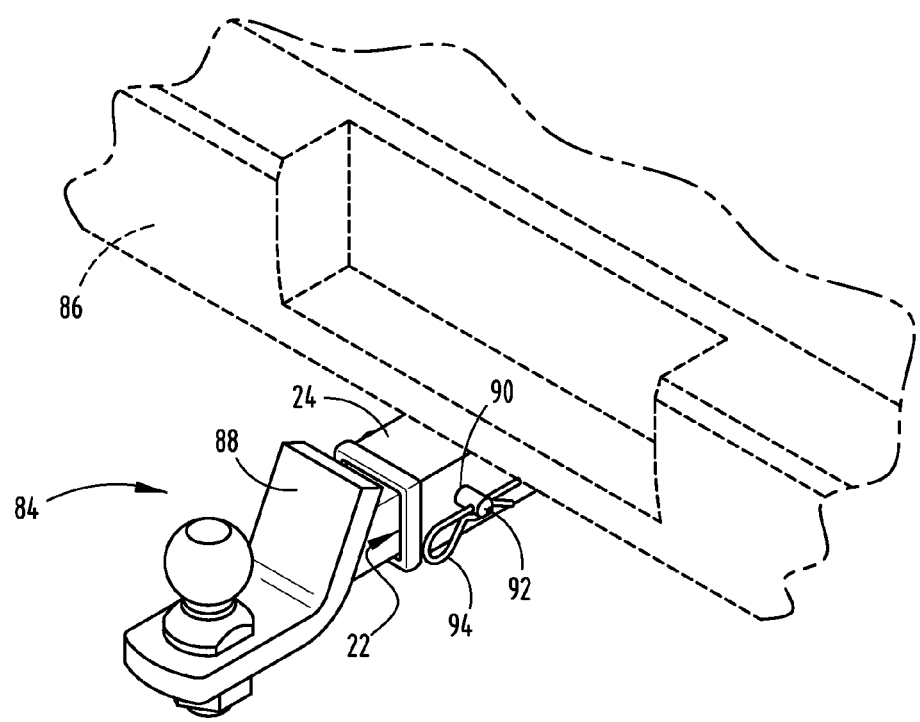
FIG. 11 is a top perspective view of a hitch assembly, according to one embodiment.

Referring now to FIG. 1, the illustrated embodiment of the multi-purpose hitch tool 10 includes the removal device 14 proximate the first end 16 of the elongated handle 12 having a first member 38 protruding orthogonally from the first lateral side 28 of the elongated handle 12. The first member 38, also referred to as a striking member, has a planar impact surface 40 distal from the elongated handle 12 that is configured to strike a hitch pin out of engagement with the hitch receiver 24 (FIG. 11). The striking member 38 has an integral portion that integrally extends away from the elongated handle 12 and curves slightly to align orthogonally relative to the body portion of the elongated handle 12. The integral portion of the striking member 38 widens as it extends away from the elongated handle 12, as also illustrated in FIG. 5, and couples with an end portion 42 that is comprised of a hard metal material that is configured to strike the hitch pin and other components of the hitch assembly without deforming. Accordingly, the planar impact surface 40 is formed on the metal material that defines the end portion 42 of the striking member 38. It is also contemplated that the striking member 38 may be a single integral piece of the elongated handle 12 or may be otherwise divided into additional pieces or components.

As also illustrated in the embodiment shown in FIG. 1, the removal device 14 includes a second member 44 protruding from the body portion of the elongated handle 12 on an opposite side from the striking member 38. More specifically, the second member 44 has a base portion 46 that integrally protrudes from the elongated handle 12 and extends a distance greater than the entire striking member 38. Contrary to the striking member 38, the base portion 46 of the second member 44 narrows as it extends away from the elongated handle 12, as also illustrated in FIG. 5. At a distal end of the base portion 46, a cylindrical neck portion 48 extends to a head portion 50 of the second member 44. The diameter or width of the neck portion 48 is less than the diameter or width of the head portion 50, such that a retention surface 52 is formed on an inward facing region of the head portion 50. The retention surface 52 is configured to engage in a loop of a cotter pin 94 (FIG. 12A), which may be used to forcibly remove the cotter pin 94, as described in more detail below. Similar to the end portion of the striking member 38, the neck portion 48 and head portion 50 of the second member 44 are comprised of a metal material in the illustrated embodiment for facilitating removal of the cotter pin 94. Again, it is conceivable that the second member 44 may be a single integral piece of the elongated handle 12 or may otherwise be further separated into additional components.

Figure 7:
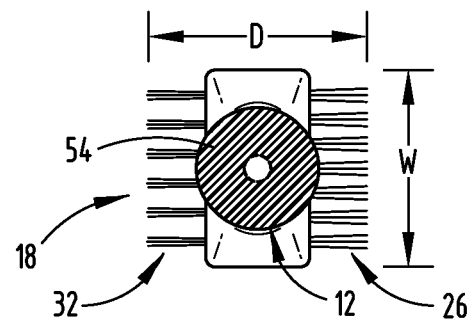
FIG. 7 is a cross-sectional top plan view of an elongated handle of the multi-purpose hitch tool, taken at line VII-VII of FIG. 2.

As further shown in FIGS. 1-4, a body portion 54 of the elongated handle 12 spans generally linearly between the first and second ends 16, 20 thereof. Also, the body portion 54 has a thickness that tapers towards the first and second ends 16, 20, resulting in a central region of the body portion 54 having the greatest circumference. As illustrated in FIG. 7, the cross section of the body portion 54 is generally circular, although it is understood that it may include additional or alternative shapes, such as an ovular shape, a polygonal shape, or other conceivable shapes. It is contemplated that in additional embodiments the body portion 54 may also have finger indentations, an elastomeric encasement, or other features that may aid in providing a comfortable gripping surface for a user. It is also understood that the body portion 54 may be formed to have a slight curvature or a varied thickness from that shown in the illustrated embodiment. However, the thickness of the elongated handle 12 at least proximate the brush assembly 18 shall generally be configured to fit within the interior cavity 22 of the hitch receiver 24.

Referring now to FIGS. 3-4, the brush assembly 18 in the illustrated embodiment is shown having the first and second bristle arrays 26, 32 disposed over the corresponding first and second lateral sides 28, 34 of the body portion 54 of the elongated handle 12, proximate the second end 20 thereof. The first bristle array 26, as shown in FIG. 3, includes a series of filament clusters 56 spaced in a symmetrical pattern over a first planar surface 58 on the first lateral side 28. The filament clusters 56 include rigid metal filaments, having at least three filaments in each cluster, more preferably at least fifteen filaments in each cluster, and most preferably between ten and twenty filaments in each cluster. Specifically, the rigid metal filaments in the illustrated embodiment are comprised of a hard steel wire, although it is understood that brass and other metals may be included. The symmetrical pattern of the filament clusters 56 of the first bristle array 26 are arranged in diagonal rows, where four filament clusters 56 are even spaced across the width of the first planar surface 58 and nine filament clusters 56 are spaced along the length of the first planar surface 58. The pattern is interrupted by two apertures 60 that are each aligned with the center of the width of the first planar surface 58 and evenly spaced along the length of the first planar surface 58.

The second bristle array 32, as shown in FIG. 4, similarly includes a series of filament clusters 62 spaced in a symmetrical pattern over a second planar surface 64 on the second lateral side 34 of the elongated handle 12, whereby the symmetrical pattern includes linear rows of filament clusters 62 extending in alignment across the width of the second planar surface 64. Accordingly, the linear rows include six filament clusters 62 extending across the width of the second planar surface 64 and eleven filament clusters 62 spaced along the length of the second planar surface 64. Similar to the first bristle array 26, the symmetrical pattern of the second bristle array 32 is interrupted by two apertures 60 that are centered across the width of the second planar surface 64 and evenly spaced along the length of the second planar surface 64. The filament clusters 62 of the second bristle array 32 also include at least three resilient filaments that are less rigid than the rigid metal filaments, preferably at least fifteen filaments in each cluster, and more preferably between ten and twenty filaments in each cluster. The resilient filaments of the second bristle array 32 in the illustrated embodiment are comprised of a polymer material having the rigidity and resiliency to flex within the hitch reliever 24, as described in more detail below. It is understood that the first and second bristle arrays 26, 32 may be arranged in alternative patterns over the first and second planar surfaces 58, 64 and may not be arranged in filament clusters 62, such that the filaments may be individually spaced over the surfaces. It is also contemplated that more or fewer filaments or filaments of different materials may be included between the first bristle array 26 and the second bristle array 32 to adjust the relative rigidity and resiliency of the overall brush assembly 18. Furthermore, it is understood that the first and second planar surfaces 58, 64 may be alternatively shaped from the illustrated generally rectangular shape to include other geometric configurations such as square, oval, or triangular planar surfaces.

Figure 6:
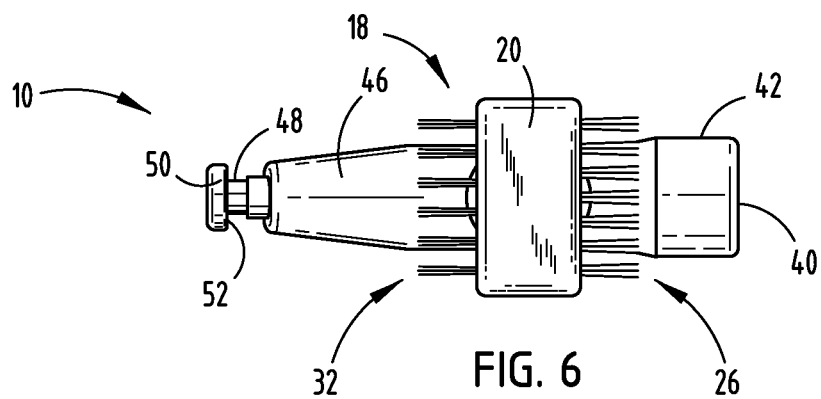
FIG. 6 is a bottom plan view of the multi-purpose hitch tool.

As illustrated in FIGS. 6-7, the width W of the brush assembly 18 spanning laterally across the first and second bristle arrays 26, 32 is generally less than the thickness between the side surfaces of the body portion 54 of the elongated handle 12 proximate the second end 20 thereof. Specifically, in the illustrated embodiment, the width W is less than two inches to fit within the interior cavity 22 of the hitch receiver 24 shown in FIG. 13. Further, the distance D between distal ends of the rigid metal filaments and the resilient filament is generally a greater distance than the width W of the bristle arrays and greater than the distance between the opposing surfaces of the body portion 54 proximate the second end 20 of the elongated handle 12. Specifically, in the illustrated embodiment, the distance D is greater than two inches to force the brush assembly 18 to bend within the interior cavity 22 of the hitch receiver 24 shown in FIG. 13. To accommodate the generally rectangular bristle arrays 26, 32, the second end 20 of the body portion 54 of the elongated handle 12 is similarly formed in a rectangular prism shape. It is contemplated that the filaments may be elongated to accommodate a larger sized interior cavity of a hitch receiver. Again, it is understood that the second end 20 of the elongated handle 12 may be curved or otherwise altered from the illustrated embodiment.

Figure 8:
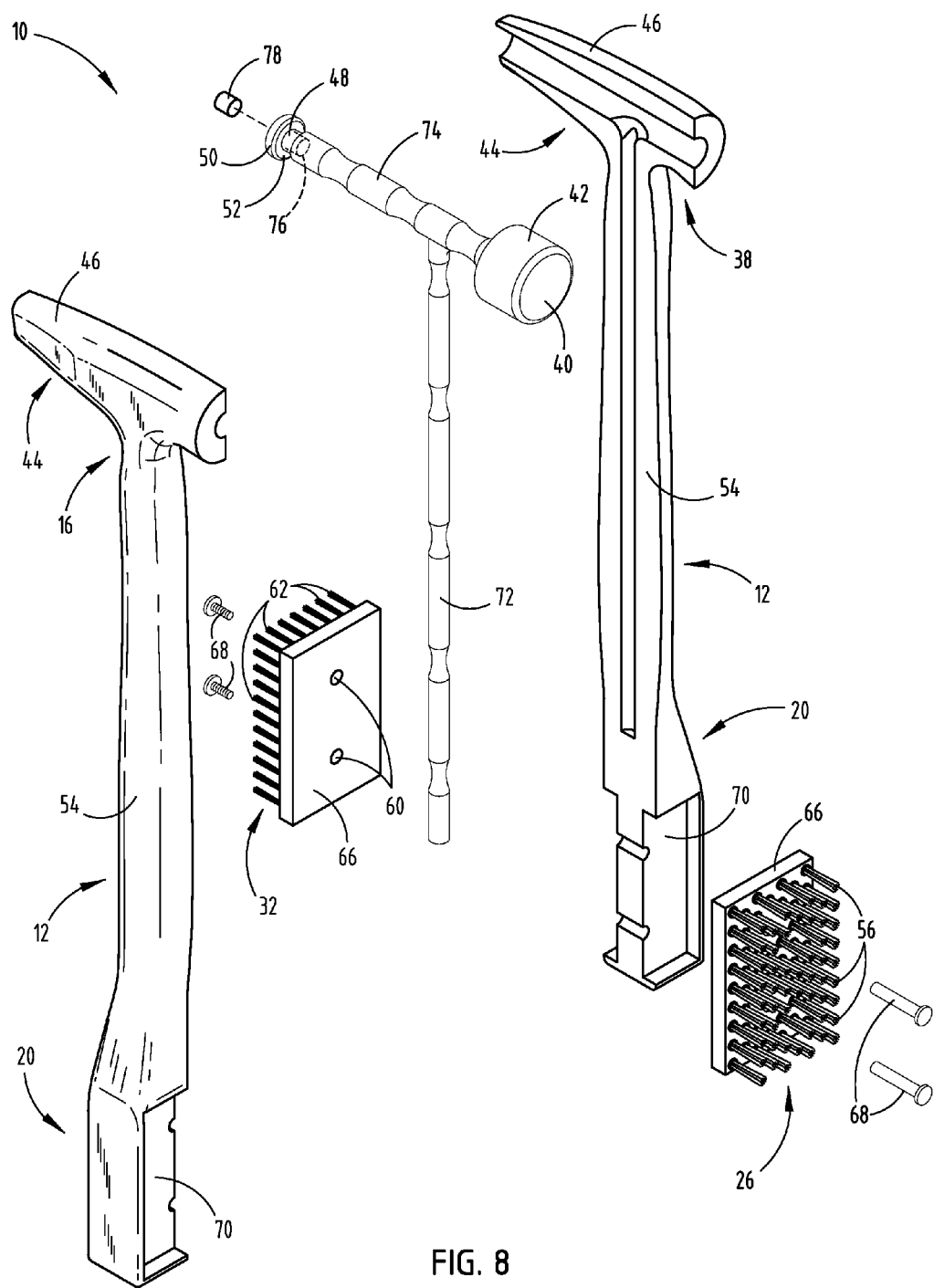
FIG. 8 is an exploded top perspective view of the multi-purpose hitch tool.
Figure 9:
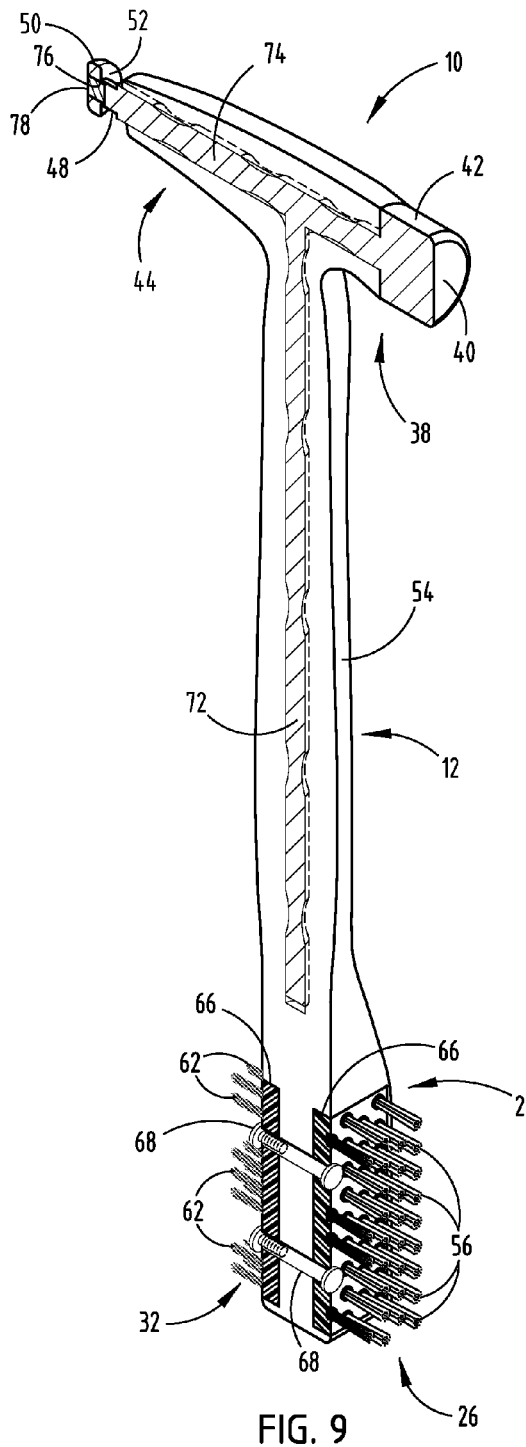
FIG. 9 is a cross-sectional top perspective view of the multi-purpose hitch tool, taken at line IX-IX of FIG. 5.

Referring now to FIGS. 8-9, the first and second bristle arrays 26, 32 are shown to each include a removable plate 66 that couples with proximal ends of the rigid metal filaments and the resilient filaments. A pair of fasteners 68 extends through the apertures 60 disposed on the first and second bristle arrays 26, 32 and extend through the removable plates 66 and the body portion 54 of the elongated handle 12 proximate the second end 20. The rectangular prism shape of the body portion 54 of the elongated handle 12 proximate the second end 20 includes shallow cavities 70 formed on the first and second lateral sides 28, 34 to receive and contain the removable plates 66 of the first and second bristle arrays 26, 32. The fasteners 68 include screws that are inserted from the second lateral side 34 and threaded receiving posts that are inserted from the first lateral side 28. These fasteners 68 are configured such that a user may remove the fasteners 68 and the removable plates 66 from the elongated handle 12, and thereby replace the first or second bristle arrays 26, 32 with a new or alternative bristle array. The removability feature of the first and second bristle arrays 26, 32 also allows for replacement of worn out bristle arrays and also allows for customization of the bristle arrays for alternatively shaped hitch receivers 24, hitch receivers 24 made of a specific material, or for a specific type of cleaning within the hitch receiver 24. It is contemplated that the fasteners 68 could be replaced with clips or other attachment features to retain the first and second bristle arrays 26, 32 to the elongated handle 12.

As also illustrated in FIGS. 8-9, a metal core member 72 extends within and along the central region of the elongated handle 12 and couples with an internal support member 74 that extends orthogonally to the core member 72, proximate the first end 16 of the elongated handle 12. The internal support member 74 extends within an interior of the removal device 14 (FIG. 2), spanning from the end portion 42 of the striking member 38 to the head portion 50 of the second member 44. The core member 72 and the internal support member 74 may be an integral piece or otherwise attached to form a T-shape that supports and strengthens the elongated handle 12 and the removal device 14 of the multi-purpose hitch tool 10. The head portion 50 and neck portion 48 of the removal device 14 is also shown to include a recess 76 for receiving a small magnet 78. The magnet 78 is situated in the neck portion 48 to provide a magnetized exterior surface of the neck head and portions 48, 50 of the removal device 14, including the retention surface 52, for retaining the cotter pins upon removal. It is generally understood that the small magnet 78 may be inserted further into the support member 74 or alternatively integrated into the second member 44 of the removal device 14. It is also contemplated that the removal device 14 may be alternatively magnetized from the magnet 78, such as by exposing the removal device 14 or a portion thereof to a magnetic field or by performing other steps to provide the removal device 14 with a magnetized exterior surface. It is also generally understood that the end portion 42 having the striking member 38 may be separately attached to the support member 74, such as by a threaded attachment.

Figure 10:
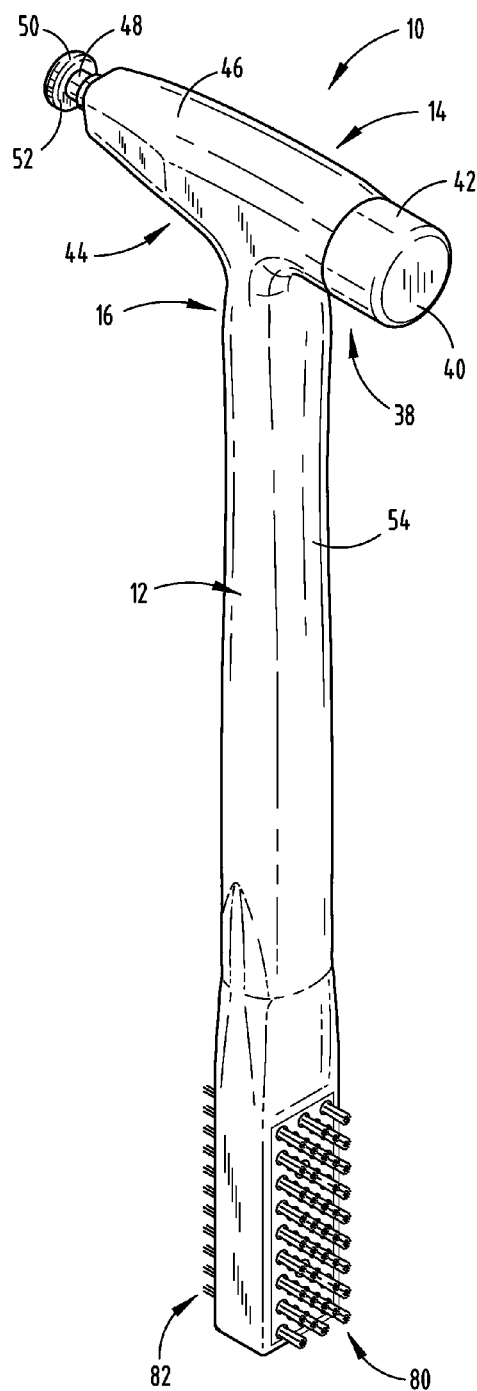
FIG. 10 is a top perspective view of an additional embodiment of the multi-purpose hitch tool.

Referring now to FIG. 10, an additional embodiment of the multi-purpose hitch tool 10 is illustrated, showing an alternatively sized brush assembly 80 coupled with a second end 82 of the elongated handle 12. As such, the second end 82 of the elongated handle 12 is appropriately sized to hold smaller sized removable first and second bristle arrays of the brush assembly 80. More specifically, the brush assembly 80 of the additional embodiment is constructed for use with class 1 and class 2 trailer hitches typically having hitch receivers with a 1¼"×1¼" interior cavity. It is contemplated that the bristles may be elongated to accommodate a 2½"×2½" interior cavity or other sized interior cavities. Accordingly, it is also contemplated that in additional embodiments of the multi-purpose hitch tool 10, the brush assembly 18, elongated handle 12, and removal device 14 may be specifically configured for a particular type of hitch assembly.

Referring now to FIGS. 11-14D, operation of the multi-purpose hitch tool 10 is illustrated with one embodiment of a hitch assembly 84. The hitch assembly 84 shown in FIG. 11 includes a hitch receiver 24 fixedly attached to a rear portion of a vehicle 86, preferably below a bumper of the vehicle 86. In the illustrated embodiment, the hitch receiver 24 may be rated for a class 3 or class 4 trailer hitch, as it is sized with an interior cavity 22 generally measuring 2"×2". To accommodate a particular trailer, the hitch assembly 84 may be fit with an appropriate hitch mount 88, whereby the hitch mount 88 is inserted and engaged within the hitch receiver 24. For instance, the hitch mount 88 may be a ball-type configuration that is appropriately sized to mate with the tongue of the particular trailer. The hitch mount 88 in the illustrated embodiment includes an angled drop that provides a generally lowered horizontal surface for supporting a trailer ball. The portion of the hitch mount 88 inserted within the interior cavity 22 of the hitch receiver 24 includes an aperture 90 for a hitch pin 92 to be inserted through both the hitch mount 88 and the corresponding apertures 90 in the hitch receiver 24. The hitch pin 92 thereby retains the hitch mount 88 to the hitch receiver 24. The cotter pin 94 is inserted through a lateral aperture that extends through a straight end of the hitch pin 92 to retain the straight end from being withdrawn through the aperture 90 in the hitch receiver 24 and corresponding aperture in the hitch mount 88.

Figure 12A:
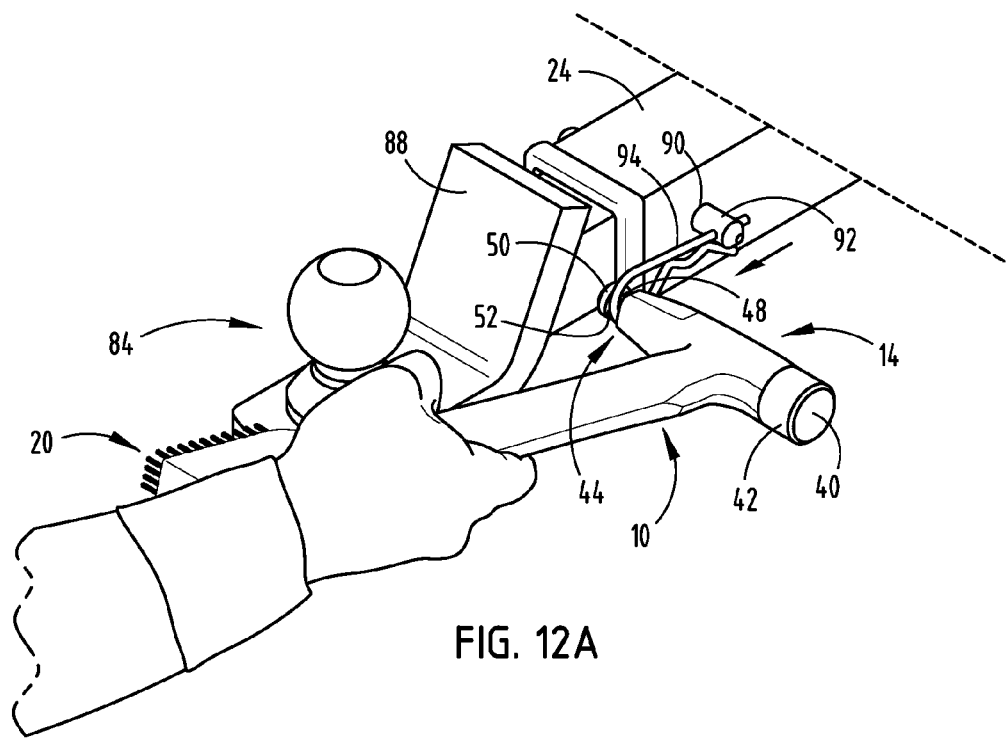
FIG. 12A is a top perspective view of a removal device of the multi-purpose hitch tool removing a cotter pin from the hitch assembly.

As shown in FIG. 12A, the second member 44 of the removal device 14 may be used to withdraw the cotter pin 94 from the hitch pin 92. More specifically, the head portion 50 of the second member 44 is inserted through a loop in the cotter pin 94 and the neck portion 48 and retention surface 52 of the head portion 50 engage the cotter pin 94 allowing a user to apply a force to the cotter pin 94 in the direction generally in line with the lateral aperture extending through the hitch pin, allowing a ridge in the cotter pin 94 to move past the hitch pin 92 and thereby disengage the cotter pin 94 from the hitch pin 92. Upon complete removal of the cotter pin 94 from the hitch pin 92, the magnet 78 (FIG. 12B) integrated in the second member 44 of the removal device 14 may magnetically retain the cotter pin 94 to the neck and head portions 48, 50 of the removal device 14.

Figure 12B:
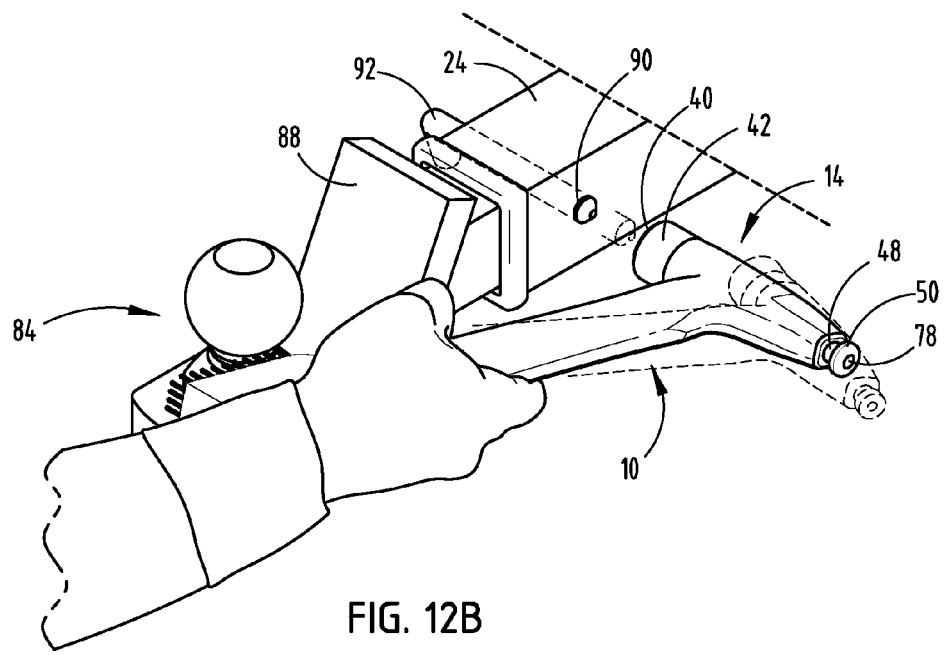
FIG. 12B is a top perspective view of the removal device striking a hitch pin out of engagement with the hitch assembly.

As illustrated in FIG. 12B, the removal device 14 is alternatively shown with the striking member 38 of the removal device 14 making impact with the hitch pin 92 and driving the hitch pin 92 laterally with respect to the hitch receiver 24. The impact from the striking member 38 disengages the hitch pin 92 from the apertures 90 extending through both the hitch receiver 24 and the hitch mount 88. More specifically, the impact surface 40 of the striking member 38 contacts the straight end of the hitch pin 92 to facilitate driving the hitch pin 92 out of engagement with the hitch receiver 24. Accordingly, the removal device 14 is helpful in disengaging both the cotter pin 94 and the hitch pin 92 from the hitch assembly 84, providing improved removal of the hitch mount 88 from the hitch receiver 24. The striking member 38 may also be used to strike the hitch receiver 24 to loosen debris or to strike the hitch mount 88 to disengage it from any surface it had adhered to within the interior cavity 22.

Figure 13:
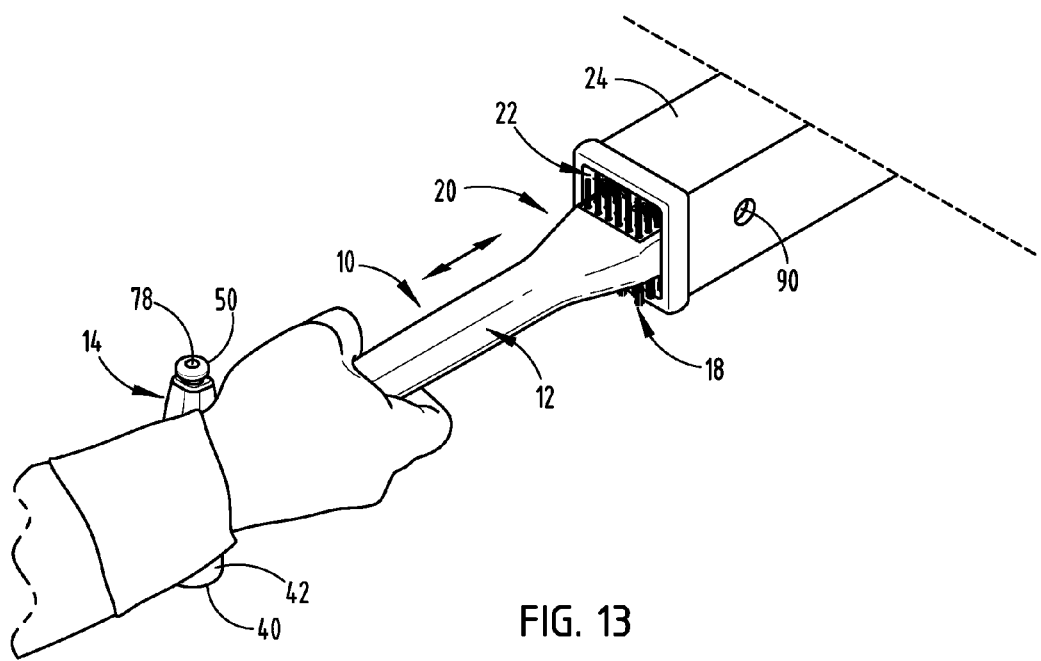
FIG. 13 is a top perspective of a brush assembly of the multi-purpose hitch tool removing debris from an interior cavity of a hitch receiver of the hitch assembly.

Referring now to FIG. 13, the user grasps a mid-portion of the elongated handle 12, similar to the location grasped for use of the removal device 14, to insert the brush assembly 18 into the interior cavity 22 of the hitch receiver 24 for removing debris therefrom. To clean the interior cavity 22, the user linearly drives the multi-purpose hitch tool 10 in generally parallel alignment with the center line of the interior cavity 22 of the hitch receiver 24. It is also contemplated that a user may alternatively grasp the elongated handle 12, such as closer to the first end 16 or the second end 20, including grasping portions of the removal device 14.

Figure 14A:
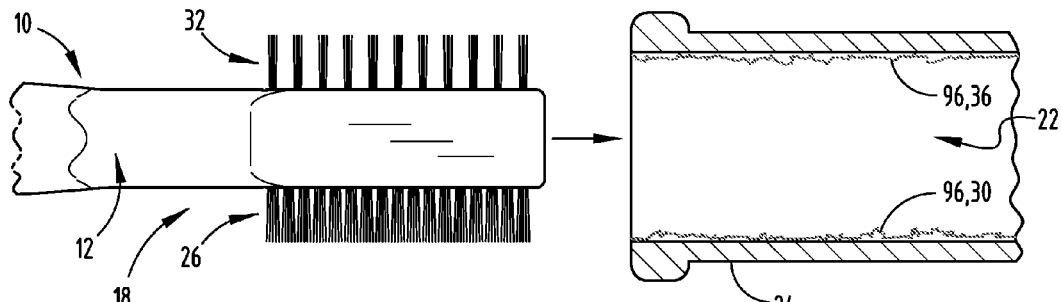
FIG. 14A is a side cross-sectional view of the brush assembly prior to being inserted into the hitch receiver.
Figure 14B:
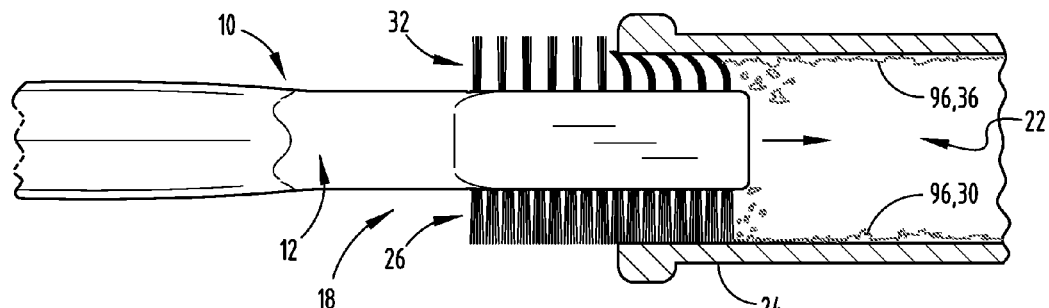
FIG. 14B is a side cross-sectional view of the brush assembly being inserted into the interior cavity of the hitch receiver.

As shown in FIGS. 14A-14B, according to one embodiment of the present invention, the brush assembly 18 is inserted into the hitch receiver 24. Prior to insertion, as shown in FIG. 14A, the first and second bristle arrays 26, 32 are aligned to engage opposing planar interior surfaces 96 of the interior cavity 22 of the hitch receiver 24. The opposing planar interior surfaces 96 each include compacted debris, which may include rust, dirt, and other particles that adhere to the opposing planar interior surfaces 96. More specifically, the accumulated debris may be a combination or any one of dirt, rust, brake dust, road debris, salt, mold, or other conceivable debris that may accumulate within the interior cavity 22 of the hitch receiver 24. Upon insertion of the brush assembly 18, the rigid metal filaments of the first bristle array 26 deform less than the resilient elements of the second bristle array 32, such that the resilient filaments flex substantially in engagement with one of the opposing planar interior surfaces 96 to bias the first bristle array 26 against the opposite planar interior surface 96. This bias created by the second bristle array 32 provides greater force to hold the first bristle array 26 against the interior cavity 22, causing more efficient removal of debris from at least the planar interior surface 96 engaged by the first bristle array 26.

Figure 14C:
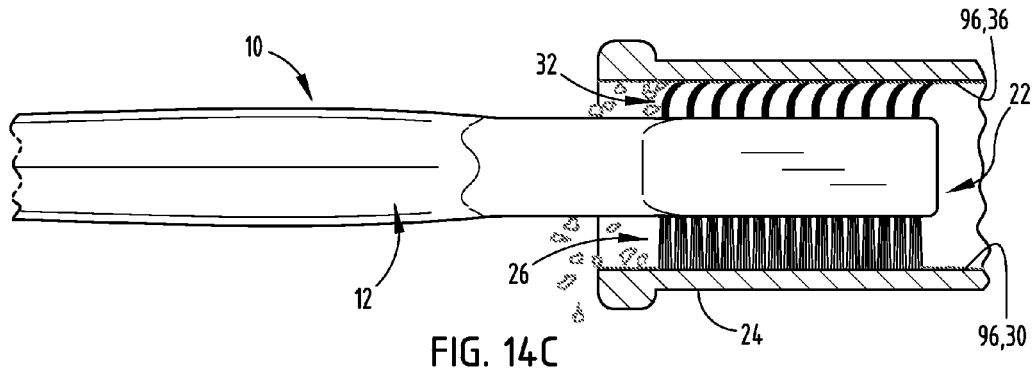
FIG. 14C is a side cross-sectional view of the brush assembly being removed from the interior cavity of the hitch receiver.
Figure 14D:
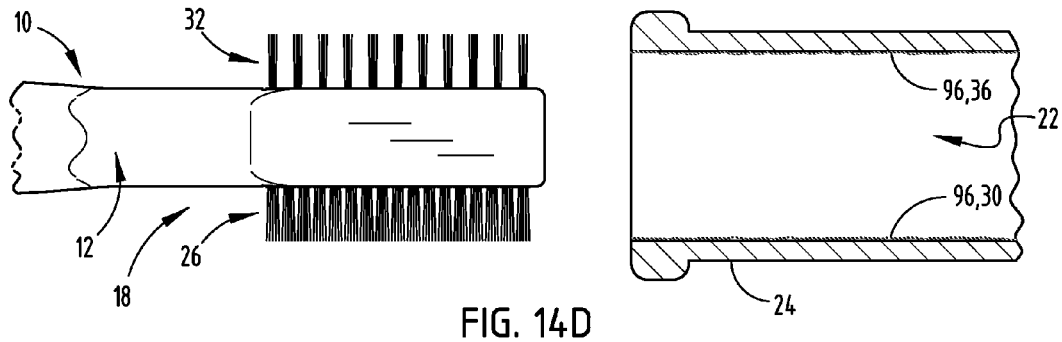
FIG. 14D is a side cross-sectional view of the brush assembly and hitch receiver after the brush assembly is removed from the hitch receiver.

As illustrated in FIGS. 14C-14D, upon reaching a point within the interior cavity 22 where it is desired to reverse direction of the brush assembly 18 and remove it from the hitch receiver 24, the second bristle array 32 flexes in the opposite direction and maintains a biasing force to hold the first bristle array 26 against the interior cavity 22. The resiliency of the second bristle array 32 allows the filaments of the first and second bristle arrays 26, 32 to reverse direction in bending. This reversal in bending of the filaments allows withdrawal of the brush assembly 18 from the hitch receiver 24 while also providing a similar cleaning effect to the interior cavity 22 in the withdrawal direction. Further, the reversal in bending decreases damage and fraying done to the first and second bristle arrays 26, 32 that may otherwise be caused by the bristles maintaining one direction of bending upon reversing direction of the brush assembly 18 within the hitch receiver 24. As shown in FIG. 14B, the second bristle array 32 is less efficient in removing debris from the second interior surface 36 of the interior cavity 22 due to the resiliency of its filaments. However, the biasing effect of the resilient filaments causes the first bristle array 26 to efficiently clean most debris from the first interior surface 30 of the interior cavity 22. Accordingly, the brush assembly 18 may be rotated and realigned for the first bristle array 26 to contact each planar interior surface 96 of the hitch receiver 24. However, frequently the bottom planar interior surface 96 of the hitch receiver 24 accumulates the most debris, and therefore only using the brush assembly 18 with the first bristle array 26 contacting the bottom planar interior surface 96 may be sufficient for cleaning the hitch receiver 24.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A multi-purpose hitch tool comprising:
    an elongated handle;
    a removal device coupled with a first end of the elongated handle and having a member protruding laterally from the elongated handle that is either configured to remove a cotter pin from a hitch pin or configured to strike the hitch pin out of engagement with a hitch receiver, wherein said member includes a neck portion that extends to a head portion having a first width that is less than a second width of the head portion and the second width is sized to fit within an aperture of a cotter pin; and
    a brush assembly coupled with a second end of the elongated handle opposite the first end and configured to remove debris from an interior cavity of the hitch receiver, the brush assembly comprising:
    a first bristle array disposed over a first lateral side of the elongated handle, wherein the first bristle array is configured to scrape the debris from a first interior surface of the interior cavity; and
    a second bristle array disposed over a second lateral side of the elongated handle opposite the first lateral side, wherein the second bristle array is less rigid than the first bristle array and is configured to bend against a second interior surface within the interior cavity to bias the first bristle array against the first interior surface.

2. The multi-purpose hitch tool of claim 1, wherein the head portion includes a magnetized material for holding the cotter pin after removal from the hitch pin.

3. The multi-purpose hitch tool of claim 2, wherein the removal device further comprises:
    a striking member protruding orthogonally from the elongated handle proximate the first end on an opposite lateral side of the elongated handle from the member, the striking member having a planar impact surface distal from the elongated handle that is configured to strike the hitch pin out of engagement with the hitch receiver.

4. The multi-purpose hitch tool of claim 1, wherein the first bristle array includes rigid filaments and the second bristle array includes resilient filaments that are less rigid than the rigid filaments.

5. The multi-purpose hitch tool of claim 1, wherein the elongated handle spans generally linearly between the first and second ends, and wherein the elongated handle has a thickness less than a distance between the first and second interior surfaces of the interior cavity of the hitch receiver.

6. A multi-purpose hitch tool comprising:
    an elongated handle that includes a first end opposite a second end, wherein a body portion of the elongated handle spans generally linearly between the first and second ends;
    a removal device protruding orthogonally from the body portion proximate the first end of the elongated handle including a rigid member having a neck portion that extends linearly away from the body portion, the removal device head portion configured to remove a cotter pin from a hitch pin that retains a hitch mount within a hitch receiver, wherein said neck portion has a first width that is less than a second width of the head portion and the second width is sized to fit within an aperture of a cotter pin; and
    a brush assembly coupled with the body portion proximate the second end of the elongated handle, the brush assembly comprising:

a first bristle array extending orthogonally from a first planar surface on a first lateral side of the body portion, wherein the first bristle array includes rigid metal ilaments configured to scrape debris from a first interior surface of the hitch receiver; and a second bristle array extending orthogonally from a second planar surface on a second lateral side of the body portion opposite the first lateral side, wherein the second bristle array includes resilient filaments configured to engage a second interior surface of the hitch receiver opposite the first interior surface and to bias the first bristle array against the first interior surface.

7. The multi-purpose hitch tool of claim 1, wherein the head portion includes a magnetized material for holding the cotter pin after removal from the hitch pin.

8. The multi-purpose hitch tool of claim 7, further comprising:

a striking member protruding orthogonally from the body portion of the elongated handle proximate the first end on an opposite lateral side of the elongated handle from the rigid member, the striking member having a planar impact surface distal from the body portion that is configured to strike the hitch pin and drive the hitch pin out of engagement with the hitch receiver.

9. The multi-purpose hitch tool of claim 6, wherein the first and second bristle arrays each include a removable plate that couples with proximal ends of the rigid metal filaments and the resilient filaments, and wherein a fastener extends through the body portion of the elongated handle and couples between the removable plates to position distal ends of the rigid metal filaments and the resilient filaments outward away from the proximal ends and the body portion.

10. The multi-purpose hitch tool of claim 9, wherein a distance between the distal ends of the rigid metal filaments and the resilient filaments is greater than a distance between the first and second interior surfaces of the hitch receiver.

11. The multi-purpose hitch tool of claim 6, wherein a width of the brush assembly spanning laterally across the first and second bristle arrays is less than a distance between the first and second interior surfaces of the hitch receiver, and wherein the body portion of the elongated handle has a thickness less than the distance between the first and second interior surfaces.

12. The multi-purpose hitch tool of claim 6, wherein the first and second planar surfaces proximate the second end of the body portion each have a generally rectangular shape, and wherein the first and second bristle arrays include a series of filament clusters spaced in a symmetrical pattern over the rectangular shape.

13. The multi-purpose hitch tool of claim 12, wherein the filament clusters each include at least three of the respective resilient filaments or rigid metal filaments.

14. A multi-purpose hitch tool configured for cleaning and removing components of a hitch assembly, comprising:

an elongated handle that includes a first end, a second end opposite the first end, and a body portion that spans generally linearly between the first and second ends and has a thickness less than a distance between opposing planar surfaces of a hitch receiver;

a removal device coupled with the elongated handle proximate the first end, the removal device having a first member protruding orthogonally from the body portion for striking the hitch assembly and a second member protruding from the body portion on an opposite side from the first member that includes a neck portion extending to a head portion for removing a cotter pin from the hitch assembly, wherein said neck portion has a first width that is less than a second width of the head portion and the second width is sized to fit within an aperture of a cotter pin; and a brush assembly coupled with the elongated handle proximate the second end, the brush assembly comprising:

a first bristle array extending orthogonally from a first planar surface on a first lateral side of the body portion, wherein the first bristle array includes rigid metal filaments configured to engage one of the opposing planar surfaces of the hitch receiver and to scrape debris therefrom; and a second bristle array extending orthogonally from a second planar surface on a second lateral side of the elongated handle opposite the first lateral side, wherein the second bristle array includes resilient filaments that are less rigid than the rigid metal filaments and configured to bend in engagement with the other one of the opposing planar surfaces of the hitch receiver to bias the first bristle array against the one of the opposing planar surfaces of the hitch receiver.

15. The multi-purpose hitch tool of claim 14, wherein the first and second bristle arrays each include a removable plate that couples with proximal ends of the rigid metal filaments and the resilient filaments, and wherein a fastener extends through the body portion of the elongated handle and couples between the removable plates to position distal ends of the rigid metal filaments and the resilient filaments outward away from the proximal ends and the body portion.

16. The multi-purpose hitch tool of claim 15, wherein a width of the brush assembly is less than a distance between the first and second interior surfaces of the hitch receiver, and wherein the first and second bristle arrays include a series of filament clusters spaced in a symmetrical pattern over the first and second planar surfaces proximate the second end of the body portion, each of the filament clusters including at least three of the respective resilient filaments or rigid metal filaments.

* * * * *